United States Patent [19]
Saito et al.

[11] Patent Number: 6,131,957
[45] Date of Patent: Oct. 17, 2000

[54] FIXING CONSTRUCTION FOR PIPE JOINT

[75] Inventors: Kikuo Saito, Hyogo-ken; Tamotsu Maenishi, Sanda, both of Japan

[73] Assignee: Waterworks Technology Development Organization Co., Ltd., Osaka, Japan

[21] Appl. No.: 09/270,964

[22] Filed: Mar. 17, 1999

[30] Foreign Application Priority Data

Mar. 27, 1998 [JP] Japan .................................. 10-081137

[51] Int. Cl.⁷ .................................................. F16L 41/12
[52] U.S. Cl. .................... 285/133.21; 285/197; 285/322; 285/373; 285/328
[58] Field of Search .............................. 285/133.21, 328, 285/373, 197, 198, 199, FOR 138, 322, 323, 342, 419, 368

[56] References Cited

U.S. PATENT DOCUMENTS

| | | | |
|---|---|---|---|
| 2,775,469 | 12/1956 | Brown et al. ....................... | 285/133.21 |
| 3,807,435 | 4/1974 | Fenster et al. .......................... | 285/197 |
| 4,457,541 | 7/1984 | Kelly et al. .............................. | 285/323 |
| 4,768,813 | 9/1988 | Timmons ................................. | 285/373 |
| 4,867,488 | 9/1989 | Jones ...................................... | 285/337 |
| 4,878,698 | 11/1989 | Gilchrist ................................. | 285/342 |
| 5,190,324 | 3/1993 | Bird et al. ............................... | 285/419 |
| 5,398,980 | 3/1995 | Hunter et al. ........................... | 285/337 |
| 5,553,898 | 9/1996 | Rogers ................................... | 285/197 |

*Primary Examiner*—Dave W. Arola
*Attorney, Agent, or Firm*—Fulbright & Jaworski, LLP

[57] ABSTRACT

A construction for fixing a pipe joint is disclosed. The construction includes a pipe joint body within which a fluid transport pipe is connected and engaged in a sealed state via an elastic seal, a press ring fitted on the fluid transport pipe, the press ring being peripherally divided to provide a plurality of press-ring segments, a fastener for fasting each press-ring segment to a connecting portion of the pipe joint body along a pipe axis direction, and a retainer member interposed between an outer peripheral face of the fluid transport pipe and an inner peripheral face of the press ring, the retainer member being capable of radially biting into the outer peripheral face of the fluid transport pipe. A cam surface formed in the inner peripheral face of the press ring is operable to reduce the retainer member radially with a relative movement between the pipe joint body and the press ring along the pipe axis direction in association with a fastening operation by the fastener. The pipe joint body and each press-ring segment include, at respective portions thereof opposed to each other along the pipe axis direction, an engaging recess and an engaging projection which come into engagement with each other along the pipe axis direction in association with the fastening operation by the fastener so as to restrict a relative radial displacement between the pipe joint body and each press-ring segment.

13 Claims, 8 Drawing Sheets

PRIOR ART

6,131,957

FIXING CONSTRUCTION FOR PIPE JOINT

BACKGROUND OF THE INVENTION

1. Field of the Invention

The present invention relates to a fixing construction for a pipe joint. The invention relates, more particularly, to a pipe joint fixing construction including a pipe joint body within which a fluid transport pipe is connected and engaged in a sealed state via an elastic seal, a press ring fitted on the fluid transport pipe, the press ring being peripherally divided to provide a plurality of press-ring segments, a fastener means for fasting each press-ring segment to a connecting portion of the pipe joint body along a pipe axis direction, a retainer member interposed between an outer peripheral face of the fluid transport pipe and an inner peripheral face of the press ring, the retainer member being capable of radially biting into the outer peripheral face of the fluid transport pipe, and a cam surface formed in the inner peripheral face of the press ring, the cam surface being operable to reduce the retainer member radially with a relative movement between the pipe joint body and the press ring along the pipe axis direction in association with a fastening operation by the fastener means.

2. Description of the Related Art

With the pipe joint fixing construction of the above-noted type, when the pipe joint portion and the fluid transport pipe are subjected to an external force in a mutually pulling-out direction due to an earthquake, a differential settlement or the like, the outer peripheral face of the retainer member biting into the outer peripheral face of the fluid transport pipe and the cam surface formed in the inner peripheral face of the press ring come into contact with each other progressively, so that the retainer member is reduced or deformed radially and the bite-in amount thereof increases correspondingly. As a result, a joint failure or the like due to inadvertent removal of the fluid transport pipe from the pipe joint body or an excessive relative movement along the pipe axis direction between the pipe joint body and the fluid transport pipe may be advantageously restricted.

Figure 9:
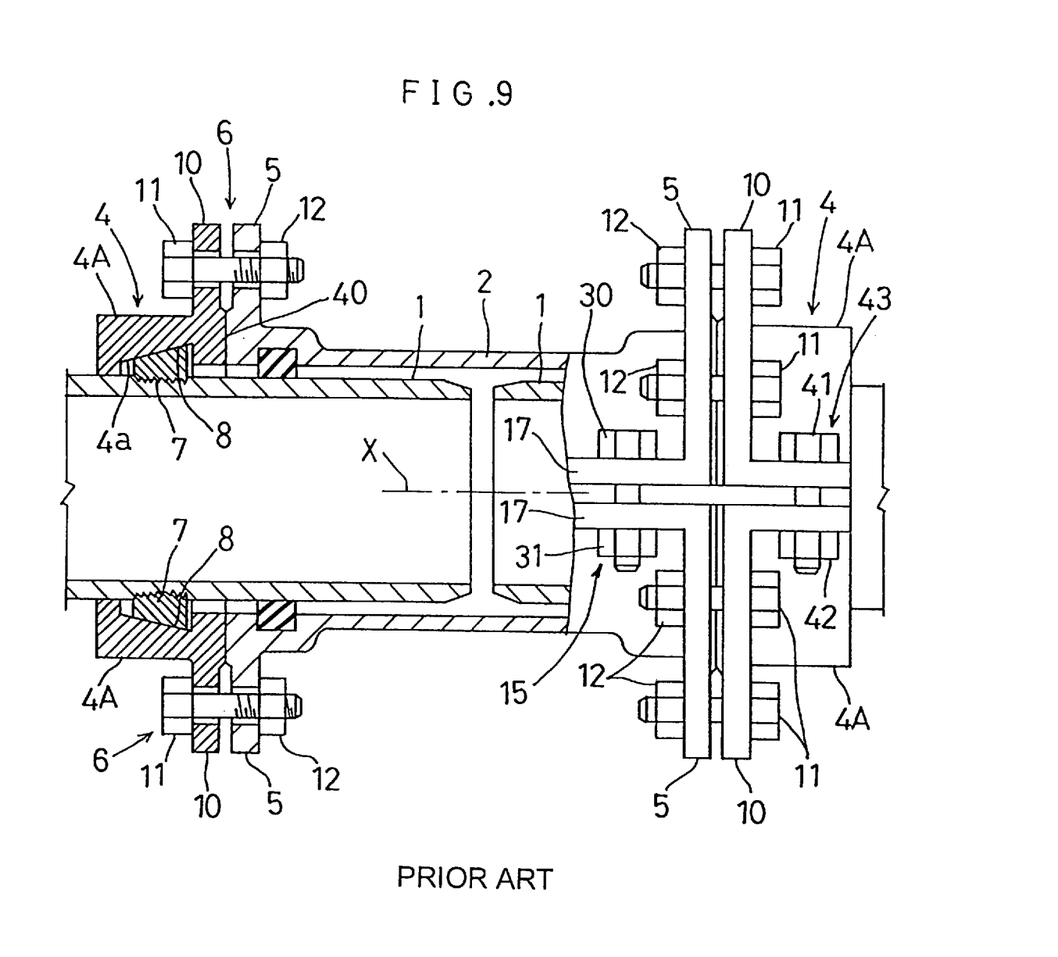
FIG. 9 is a partially cutaway section in a front elevation showing a conventional pipe joint fixing construction.

FIG. 9 shows a conventional pipe joint fixing construction having such advantage as described above. As shown, in this construction, connecting faces 40 of a connecting portion 5 of the pipe joint body 2 and of a connected portion 10 of each press-ring segment 4A are provided as smooth faces extending along a plane normal to the pipe axis direction X, which faces 40 are fastened to each other in a face-contacted state by bolts 11 and nuts 12 together constituting the fastener means 6. Further, corresponding terminal ends of the peripherally adjacent press-ring segments 4A are joined and fastened to each other by a third connecting means 43 consists of bolts 41 and nuts 42.

With the conventional pipe joint fixing construction described above, when the cam surface 8 formed in the inner peripheral face 4a of the press ring 4 radially reduces or deforms the retainer member 7 either in association with the relative movement between the pipe joint body 2 and the press ring 4 caused by the fastening operation of the fastener means 6 or as a result of an external pulling-out force being applied to the pipe joint body 2 and the fluid transport pipe 1, a corresponding reaction force in a radially outward direction is applied to each segment 4A of the press ring 4. Then, this reaction force may be effectively received in a distributed manner by the bolts 11, nuts 12 constituting the fastener means 6 as well as by the further bolts 41, nuts 42 constituting the third connecting means 43. Accordingly, the construction can effectively restrict diminishing in the bite-in amount of the retainer member 7 which would occur due to the radially outward displacement of the respective press-ring segment 4A.

For achieving the above, however, the construction requires a number of bolts 11, nuts 12 for fastening the respective segments 4A of the press ring 4 and the connecting portion 5 of the pipe joint body 2 along the pipe axis direction X and a number of further bolts 41, nuts 42 for fastening together the terminal ends of the peripherally adjacent press-ring segments 4A. As a result, the assembly operation of the pipe joint was troublesome and time-consuming.

SUMMARY OF THE INVENTION

The present invention provides a solution for the above-described drawback of the prior art. According to the features of the present invention, a pipe joint fixing construction includes a pipe joint body within which a fluid transport pipe is connected and engaged in a sealed state via an elastic seal, a press ring fitted on the fluid transport pipe, the press ring being peripherally divided to provide a plurality of press-ring segments, a fastener means for fasting each press-ring segment to a connecting portion of the pipe joint body along a pipe axis direction, a retainer member interposed between an outer peripheral face of the fluid transport pipe and an inner peripheral face of the press ring, the retainer member being capable of radially biting into the outer peripheral face of the fluid transport pipe, and a cam surface formed in the inner peripheral face of the press ring, the cam surface being operable to reduce the retainer member radially with a relative movement between the pipe joint body and the press ring along the pipe axis direction in association with a fastening operation by the fastener means, wherein the pipe joint body and each press-ring segment include, at respective portions thereof opposed to each other along the pipe axis direction, an engaging recess and an engaging projection which come into engagement with each other along the pipe axis direction in association with the fastening operation by the fastener means so as to restrict a relative radial displacement between the pipe joint body and each press-ring segment.

According to the above-described features of the present invention, when the pipe joint body and each press-ring segment are fastened together by the fastener means, the engaging recess and projection formed at mutually axially opposing portions of the joint body and the segment come into engagement with each other. Hence, when a component force is applied to each segment of the press ring for urging it to be displaced radially outward when the cam surface formed in the inner peripheral face of the press ring radially reduces the retainer member, this displacing component force may be received in a reliable and distributed manner by means of the engaging recess and projection and the fastener means.

Further, when each press-ring segment is assembled to the pipe joint body, by loosely engaging in advance the engaging recess and projection provided at the mutually axially opposing portions of the pipe joint body and each press-ring segment, a portion of the mass of the press-ring segment may be born by the pipe joint body.

As a result, through such simple and economical modification of the fixing construction which consists essentially of forming, at the mutually opposing portions of the pipe joint body and each press-ring segment, the mating recess and projection which come into engagement with each other along the pipe axis direction, this modified construction can effectively restrict diminishing in the bite-in amount of the retainer member due to the radially outward displacement of the respective press-ring segment and which can allow the assembly operation of the pipe joint to be effected in a highly efficient and easy manner with greatly reduced number of operational steps required therefor.

According to one aspect of the present invention, a pair of said press rings are fastened to opposed axial ends of said pipe joint body by said fastener means respectively, said retainer member is interposed between the outer peripheral face of said fluid transport pipe which is formed of synthetic resin material and the inner peripheral face of each one of said press rings, said fluid transport pipe includes an inwardly engaging/connecting portion on which said pipe joint body is engaged and fitted, and said pipe joint body includes a connecting pipe portion communicated with a through hole defined in a peripheral wall of said inwardly engaging/connecting portion of the fluid transport pipe.

With the above-described construction, when the press rings are fastened to the opposed axial ends of the pipe joint body, opposed axial side portions of the fluid transport pipe axially offset from the through hole in the opposite directions are fixedly connected with the opposed axial ends of the pipe joint body via the retainer members biting into the outer peripheral face of these portions of the pipe and the press rings. As a result, when the pulling-out external force due to an earthquake, differential settlement or the like is applied to the fluid transport pipe, this external force may be received in a distributed manner by the pipe joint body also. Consequently, it is possible to avoid the following problem which would occur due to concentrated application of the external force at the peripheral edge of the through hole of the fluid transport pipe.

Namely, supposing that the press ring and the retainer member are not provided at each one of the opposed axial ends of the pipe joint body, when the pulling external force is applied to the single, synthetic resin fluid transport pipe engaged and connected with this pipe joint body, this pulling force will be applied in a concentrated manner to the vicinity around the through hole defined in the peripheral wall of the inwardly engaging/connecting portion of the fluid transport pipe so as to cause elongated deformation of this peripheral edge of the through hole, which deformation in turn results in curved deformation of the entire fluid transport pipe. In the course of this, those portions of the fluid transport pipe contacting the opposed axial ends of the inner peripheral face of the pipe joint body will be elastically deformed into an oval cross-sectional shape while elastically deforming the elastic seals, so that the adhesive force (or pressure contact force) between the elastic seal and the outer peripheral face of the fluid transport pipe which are opposed to each other in the direction of the minor axis of the oval will be reduced. As a result, this portion with reduced adhesive force tends to invite leakage of the transported fluid therethrough.

However, with the above-described feature of the present invention, as the external axial pulling force may be received in a distributed manner by the pipe joint body also, such elongated deformation of the peripheral edge of the through hole of the fluid transport pipe may be effectively restricted. Hence, the amount of elastic axial deformation at the inwardly engaging/connecting portion of the fluid transport pipe may be reduced correspondingly, so as to avoid leakage of transported fluid.

Preferably, the pipe joint body is peripherally divided into a plurality of pipe-joint segments; the elastic seal is compressed into a sealing state in association with a tightening operation of a connecting means for connecting and tightening together peripherally adjacent ones of the pipe-joint segments; and said each pipe-joint segment includes, in its inner peripheral face and at each portion thereof axially offset toward an adjacent axial end thereof relative to an axially intermediate portion thereof where the elastic seal is attached, a first deformation-restricting surface which comes into contact with the outer peripheral face of the fluid transport pipe in association with the tightening operation of said connecting means for restricting radial deformation of the fluid transport pipe.

With the above construction, like the construction described hereinbefore, the opposed axial side portions of the fluid transport pipe axially offset from the through hole in the opposite directions are fixedly connected with the opposed axial ends of the pipe joint body via the retainer members biting into the outer peripheral face of these portions of the pipe and the press rings. Consequently, it is possible to avoid the problem which would occur due to concentrated application of the external force at the peripheral edge of the through hole of the fluid transport pipe. In addition, the first deformation-restricting surface formed at the portion of the inner peripheral face of each pipe-joint segment axially offset from the further portion thereof where the elastic seal is attached serves also to restrict radial deformation of the inwardly engaging/connecting portion of the fluid transport pipe, i.e. curved deformation at this inwardly engaging/connecting portion. With these effects combined, leakage of transported fluid may be restricted even more effectively.

More preferably, said each pipe-joint segment further includes, in its inner peripheral face and at a further portion thereof offset toward an axial center than the further portion where the elastic seal is attached, a second deformation-restricting surface which comes into contact with the outer peripheral face of the fluid transport pipe in association with the tightening operation of said connecting means for restricting radial deformation of the fluid transport pipe.

With the above construction, like the construction described hereinbefore, the opposed axial side portions of the fluid transport pipe axially offset from the through hole in the opposite directions are fixedly connected with the opposed axial ends of the pipe joint body via the retainer members biting into the outer peripheral face of these portions of the pipe and the press rings. Hence, it is possible to avoid the problem which would occur due to concentrated application of the external force at the peripheral edge of the through hole of the fluid transport pipe. In addition, the first deformation-restricting surface formed at the portion of the inner peripheral face of each pipe-joint segment axially offset from the further portion thereof where the elastic seal is attached and also the second deformation-restricting surface formed at the axially intermediate portion thereof together serve also to restrict radial deformation of the inwardly engaging/connecting portion of the fluid transport pipe, i.e. curved deformation at this inwardly engaging/connecting portion. With these kinds of deformation restricting effects combined, leakage of transported fluid may be restricted still more effectively.

More preferably, each of the first and second deformation-restricting surfaces includes a bite-in portion in the form of projection capable of biting into the outer peripheral face of the fluid transport pipe.

With the above construction, due to the binding effect on the fluid transport pipe resulting from compression of the elastic seal as well as to the bite-in effect of the bite-in portion into the outer peripheral face of the fluid transport pipe, when an external force in the axial or peripheral direction is applied to the fluid transport pipe and the pipe joint body due to an earthquake, differential settlement or the like, an axial or peripheral displacement between the fluid transport pipe and the pipe joint body may be effectively restricted, so that these transport pipe and the pipe joint body may be maintained under the initially assembled posture relative to each other.

Moreover, since the bite-in portion is provided in the form of projection in the deformation-restricting surface, this construction provides a merit of simplicity as not requiring increase in the number of components. Furthermore, since the bite-in portion is provided outside the seal attaching area, the bite-in portion does not damage any portion of the seal.

More preferably, the bite-in portion includes a first group of projections extending peripherally and a second group of projections inclined relative to both the axial and peripheral directions, and said second group of projections are provided at a peripherally intermediate portion of the pipe-joint segment.

With the above construction, the first group of projections are oriented along the peripheral direction, so that these projections provide a restricting effect in particular on the axial relative displacement between the fluid transport pipe and the pipe joint body. On the other hand, the second group of projections are oriented with inclination relative to both the axial direction and the peripheral direction, so that these projections provide restricting effects on the axial displacement of the pipe joint body relative to the fluid transport pipe as well as on the peripheral, i.e. rotational displacement of the former relative to the latter. Hence, by providing the bite-in portion in the form of the first group of projections and the second group of projections, it is possible to restrict also the peripheral, i.e. rotational displacement of the pipe joint body relative to the fluid transport pipe while restricting, with higher priority, the axial displacement therebetween which is apt to invite leakage of the transported fluid.

Moreover, when the peripherally adjacent pipe-joint segments are tightened and connected together, in association with this operation, the bite-in portion will be displaced in the peripheral direction while biting into the outer peripheral face of the fluid transport pipe from the peripheral ends of the pipe-joint segments. In the course of this, the second group of projections providing greater resistance in the peripheral direction are provided in the peripherally intermediate portion of the pipe-joint segment, so that this intermediate portion will be displaced by a smaller amount than the peripherally opposed end portions of the segment. Hence, in comparison with a construction in which the second group of projections are provided at each of the opposed peripheral ends of the pipe-joint segment, the manual force required for tightening operation of the connecting means may be advantageously reduced, so that the assembly operation of the pipe joint may be effected efficiently and readily with correspondingly smaller manual force.

More preferably, the second deformation-restricting surface includes the first group of projections at each axial side of the peripheral opening edge of the connecting pipe portion.

With the above construction, the first group of projections provided at each axial side of the peripheral opening edge of the connecting pipe portion in the second deformation-restricting surface will bite into the opposed axial sides of the through hole defined in the inwardly engaging/connecting portion of the fluid transport pipe.

Accordingly, when an external axial force is applied to the fluid transport pipe and the pipe joint body due to an earthquake, differential settlement or the like, thus applying a pulling external force to the fluid transport pipe engaged and connected within the pipe joint body, this external force may be received also by the pipe joint body, thus reducing the external force on the fluid transport pipe. Moreover, since the opposed axial sides of the through hole are fixedly connected with the pipe joint body via the first group of projections providing the strong restricting effect on the axial displacement between the fluid transport pipe and the pipe joint body, the reduced external force may be further distributed to the pipe joint body at these peripheral edges of the through hole also. As a result, the elongated deformation at these peripheral edges of the through hole of the fluid transport pipe may be restricted still more effectively. Hence, the elastic radial deformation of the inwardly engaging/connecting portion of the fluid transport pipe may be further reduced, thereby to restrict occurrence of leakage of transported fluid even more effectively.

Still preferably, the second group of projections include two kinds of sub-groups of projections whose inclinations are in opposition to each other.

With the above, when an external axial force is applied to the fluid transport pipe due to an earthquake, differential settlement or the like and this external force is converted, by each one of the two kinds of projections biting into the outer peripheral face of the inwardly engaging/connecting portion of the fluid transport pipe, into a torque urging the pipe joint body to rotate relative to the fluid transport pipe, as these two kinds of projections have the opposite inclinations relative to each other, the directions of the torque generated by the projections are opposite so as to be cancelled out by each other.

As a result, when an external axial force is applied to the fluid transport pipe due to an earthquake, differential settlement or the like, the relative peripheral or rotational displacement and axial displacement between the fluid transport pipe and the pipe joint body may be restricted reliably and effectively.

Further and other features and merits of the invention will become apparent from the following detailed description of the preferred embodiments with reference to the accompanying drawings.

DETAILED DESCRIPTION OF THE PREFERRED EMBODIMENTS

Preferred embodiments of the present invention will now be described in details with reference to the accompanying drawings.

[First Embodiment]

FIGS. 1 through 7 show a pipe joint fixing construction relating to a first embodiment of the present invention, in which a T-shaped branch pipe joint 2 made of cast iron, as an example of a pipe joint body, is fitted on an intermediate portion of a water pipe 1 made of polyethylene, as an example of a fluid transport pipe made of synthetic resin material, via an elastic seal 3 made of synthetic rubber in a sealed (water-tight) manner. On each one of opposed ends of the branch pipe joint 2 in the direction of pipe axis X, there is fitted a press ring 4 made of cast iron and consisting of two peripherally divided press-ring segments 4A. Further, a fastener means 6 is provided for fastening, along the pipe axis X, each press-ring segment 4A of the press ring 4 to a flange 5 as a connecting portion provided to each of opposed axial ends of the branch pipe joint 2.

Between an outer peripheral face 1a of the water pipe 1 and an inner peripheral face 4a of each press ring 4, there is interposed a substantially annular retainer ring 7 which is an example of a retainer member capable of radially biting into the outer peripheral face 1a of the water pipe 1. This retainer ring 7 is made of such material as synthetic resin, e.g. polyacetal or stainless steel capable of being elastically and radially reduced or deformed. Further, the inner peripheral face 4a of the press ring 4 includes a tapered cam face 8 having a progressively larger diameter toward the branch pipe joint 2 so as to radially reduce the retainer ring 7 as the branch pipe joint 2 and each press ring 7 are moved closer to each other along the direction of pipe axis X in association with the fastening operation of the fastener means 6.

Figure 7:
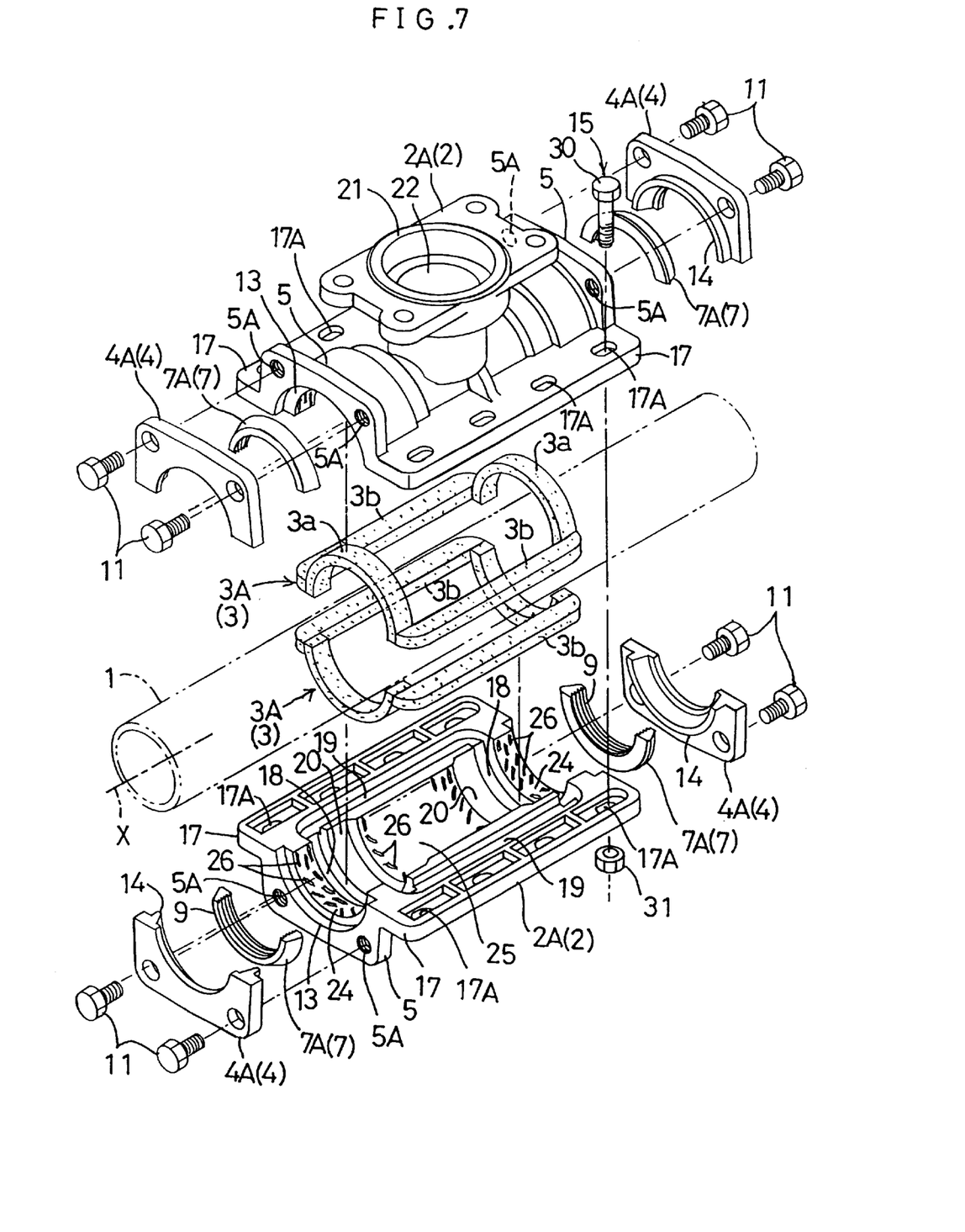
FIG. 7 is an exploded perspective view.

As shown in FIG. 7, the retainer ring 7 is peripherally divided into two semi-circular ring segments 7A. One ring segment 7A is interposed between the outer peripheral face 1a of the water pipe 1 and the inner peripheral face 4a of the one press-ring segment 4A constituting one half of the press ring 7, while the other ring segment 7A is interposed between the outer peripheral face 1a of the water pipe 1 and the inner peripheral face 4a of the other press-ring segment 4A constituting the other half of the press ring 4. Further, between peripherally opposing faces of the two ring segments 7A, there is reserved a gap for allowing the radially reducing deformation of these two ring segments 7A.

Also, each ring segment 7A includes, in its inner peripheral face, a number of bite-in ridges or pawls 9 capable of biting into the outer peripheral face 1a of the water pipe 1, and the outer peripheral face of the ring segment 7A is provided as a tapered face shaped to match the cam face 8.

The fastener means 6 includes a female screw hole 5A defined in each flange 5 of the branch pipe joint 2 and a bolt 11 to be threaded into and fastened within the female screw hole 5A through a bolt insertion hole 10A defined in a flange 10 provided, as a connected portion, to each press-ring segment 4A.

Figure 1:
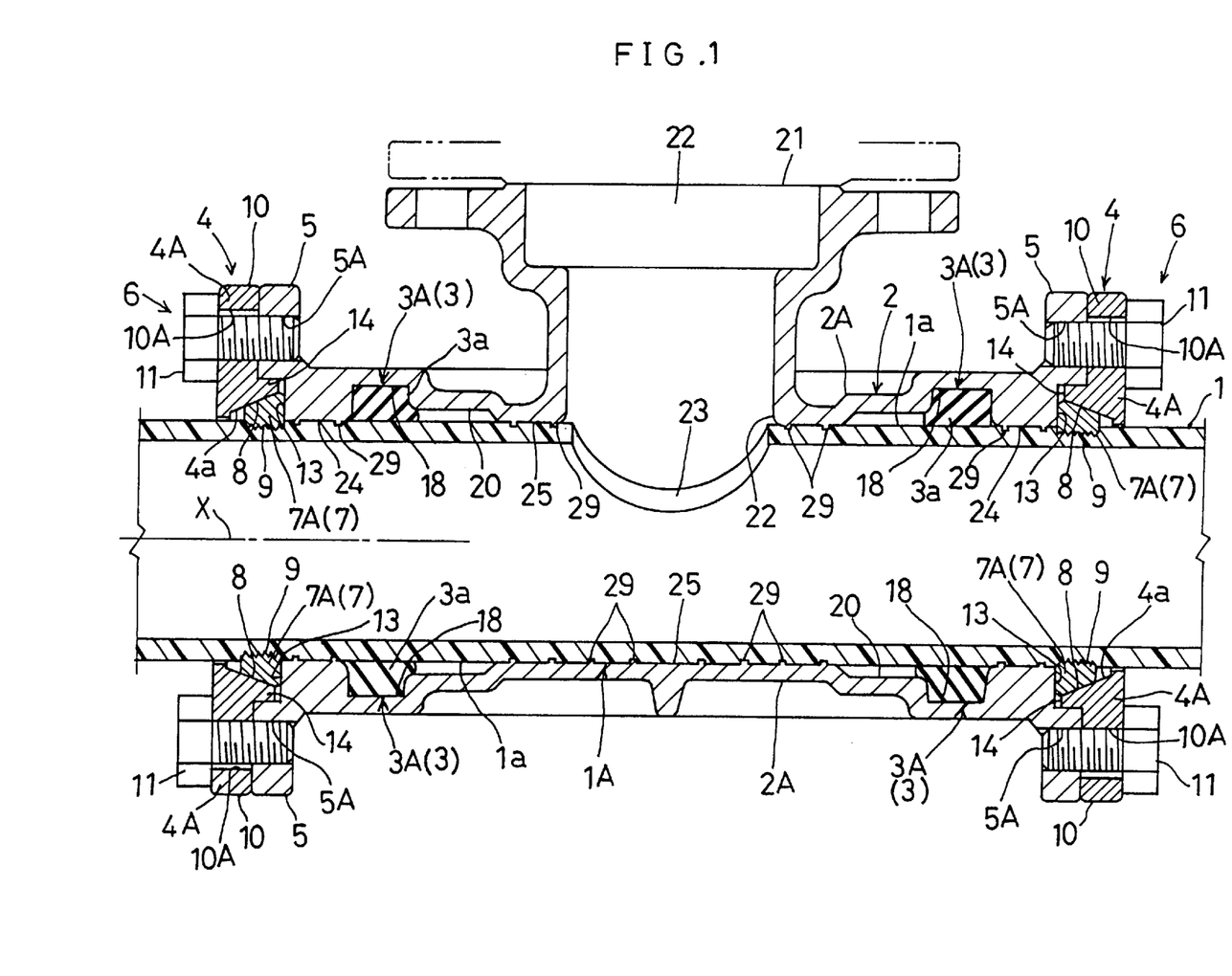
FIG. 1 is a vertical section in a front elevation showing a pipe joint fixing construction according to a first embodiment of the present invention.
Figure 2:
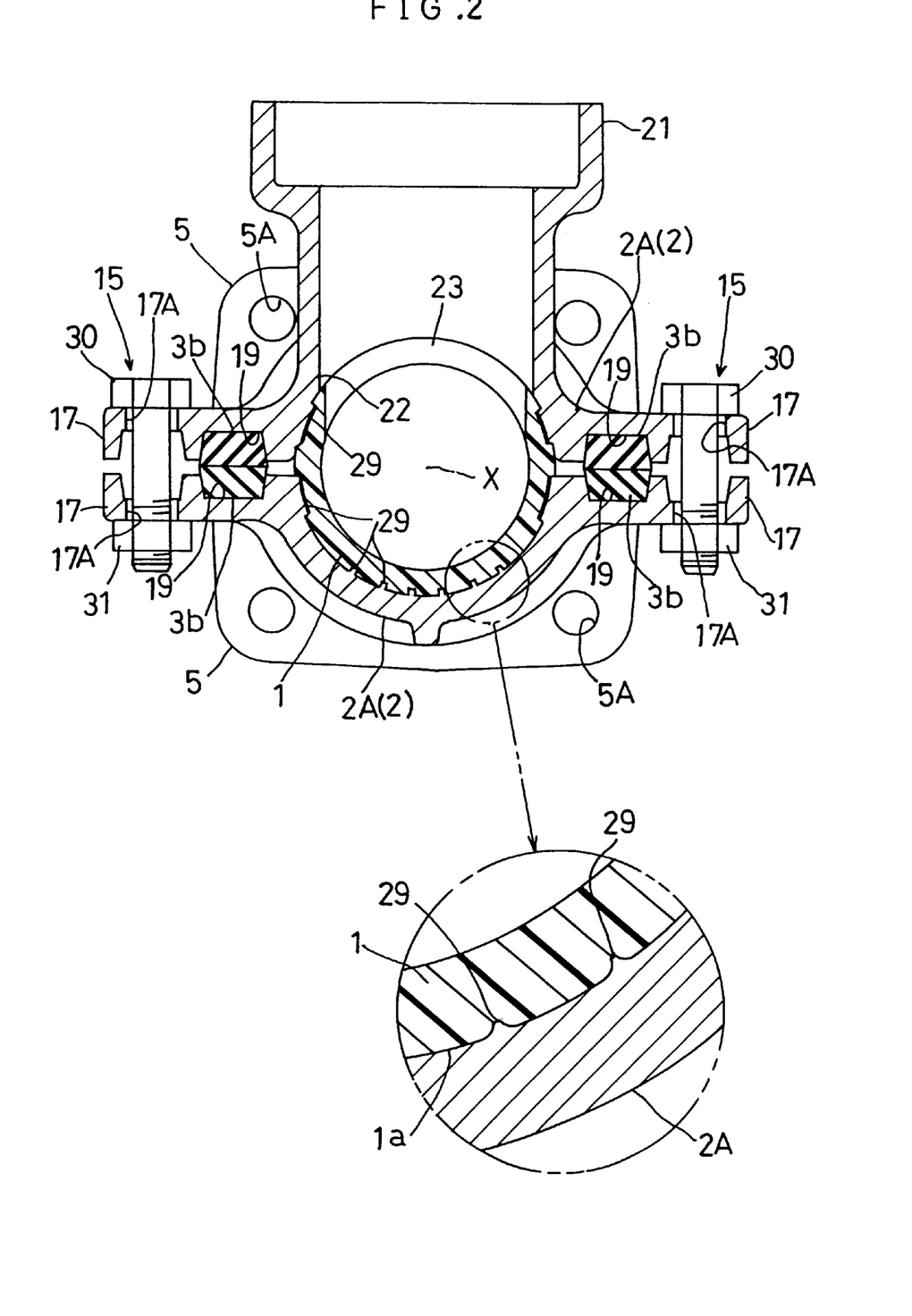
FIG. 2 is a vertical section in a side elevation of the fixing construction the first embodiment, an encircled portion drawn out by an arrow providing an enlarged view of a principal portion of the construction.
Figure 3:
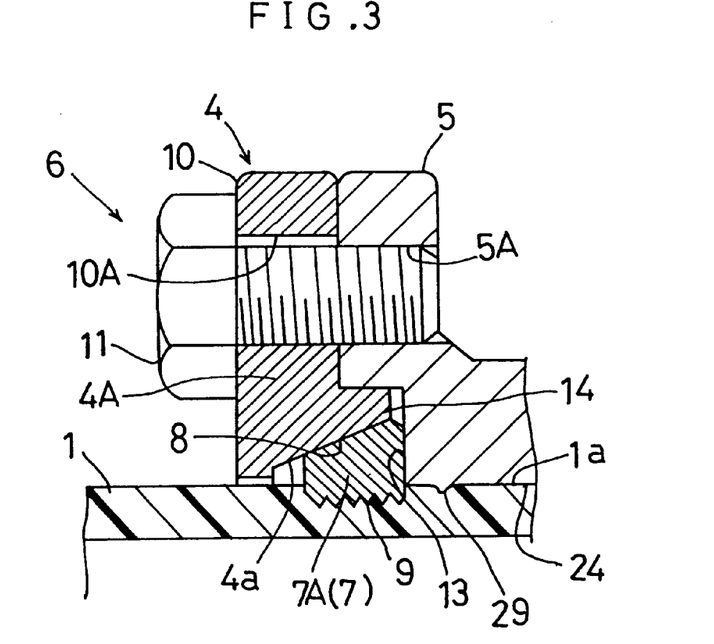
FIG. 3 is an enlarged section view showing in particular a retainer member and its vicinity also shown in FIG. 1.
Figure 4:
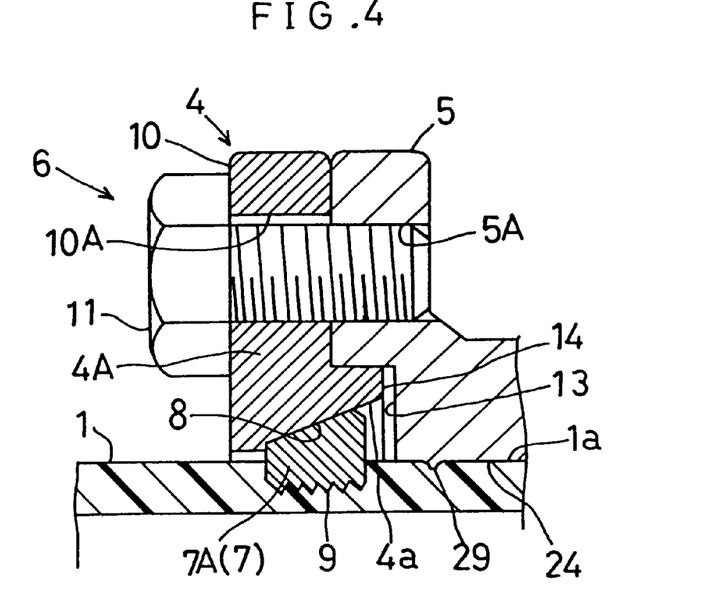
FIG. 4 is an enlarged cross section showing the retainer member and its vicinity when the retainer member is radially reduced.
Figure 5:
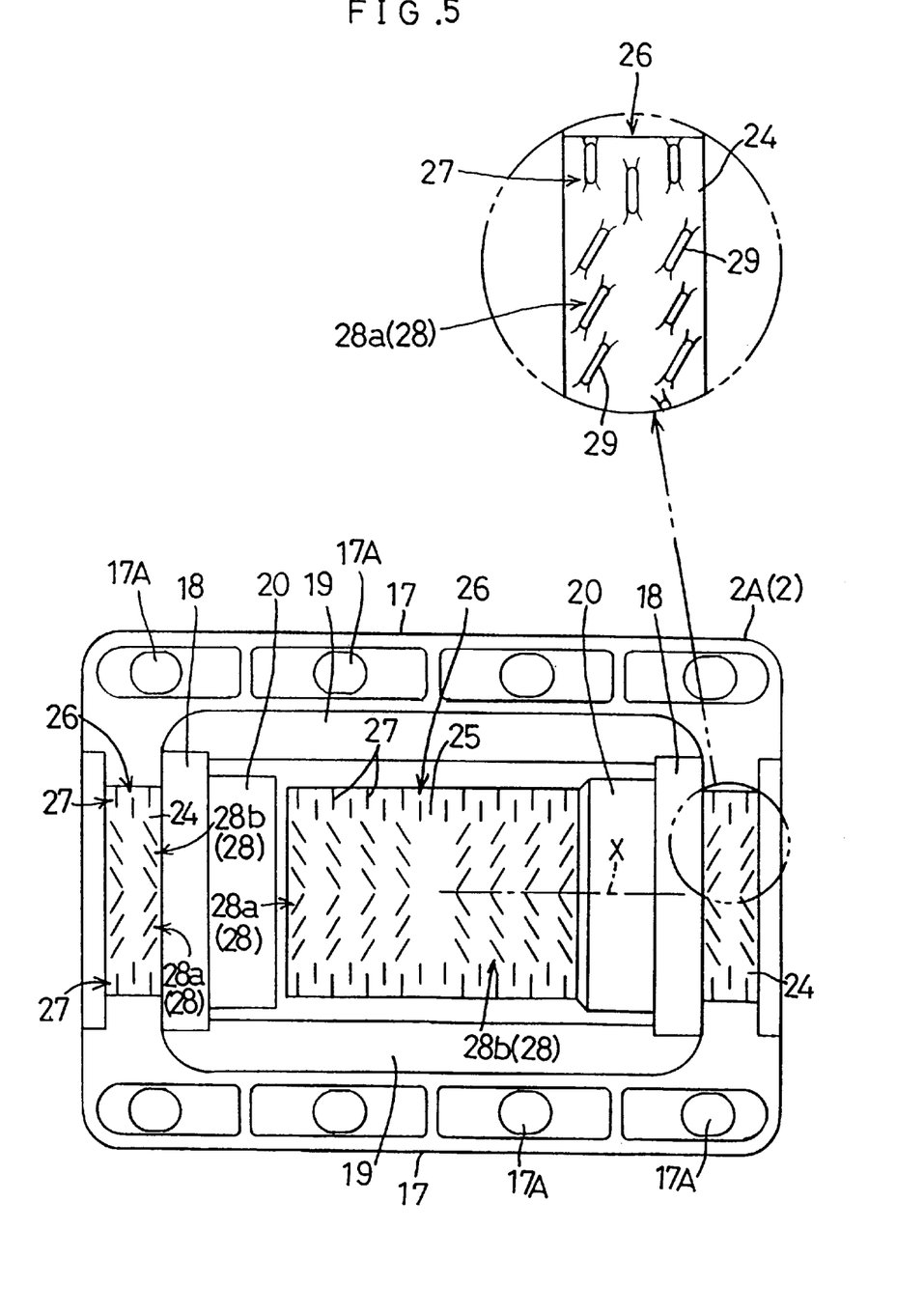
FIG. 5 is a front elevation showing an inner peripheral face side of a pipe-joint segment having no connecting pipe portion, an encircled portion drawn out by an arrow providing an enlarged view showing the principal portion.
Figure 6:
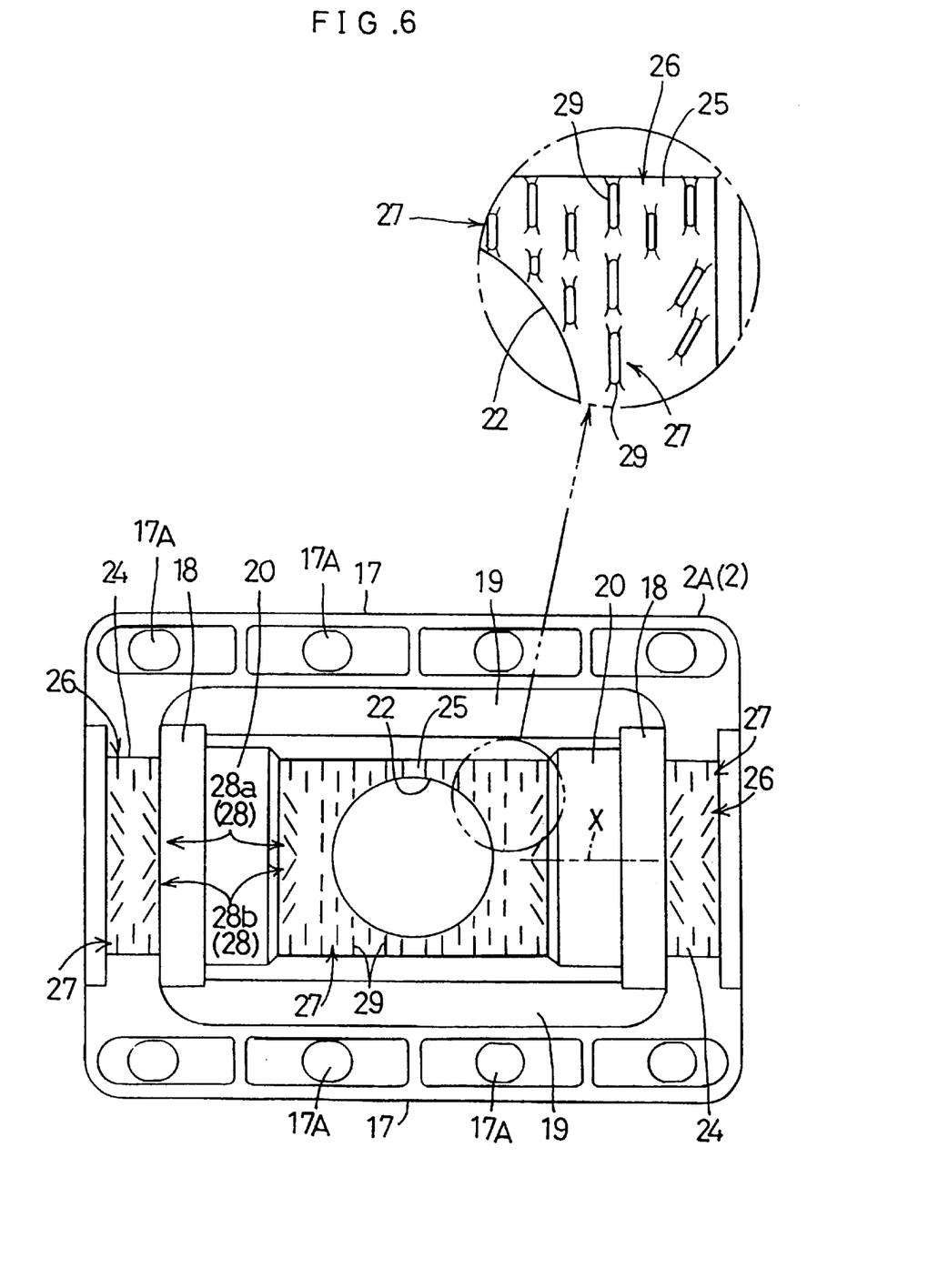
FIG. 6 is a front elevation showing an inner peripheral side of a further pipe-joint segment having a connecting pipe portion, an encircled portion drawn out by an arrow providing an enlarged view showing the principal portion.

As shown in FIGS. 1, 3 and 4, at portions of the branch pipe joint 2 and each press-ring segment 4A opposed to each other in the direction of pipe axis X, there are formed an engaging recess 13 and an engaging projection 14 which come into engagement with each other along the pipe axis direction X in association with the fastening operation of the fastener means 6, i.e. fastening operation of the bolt 11 to the female screw hole 5A. so as to restrict a relative radial displacement between the branch pipe joint 2 and each press-ring segment 4A. The engaging recess 13 is provided as an annular recess in each of the opposed end faces in the pipe axis direction X of the branch pipe joint 2, whereas the engaging projection 14 is provided as a semi-circular projection formed integrally with one end face of each press-ring segment 4A.

As shown in FIG. 7, the elastic seal 3 consists of two peripherally divided seal segments 3A. Similarly, the branch pipe joint 2 consists of two peripherally divided joint segments 2A. Each seal segment 3A is fitted and retained to the inner peripheral face of each joint segment 2A. Then, the two joint segments 2A are fitted over the outer peripheral face 1a of the water pipe 1. Thereafter, in association with a tightening operation of the connecting means 15 for fastening and connecting the peripherally adjacent joint segments 2A together, the elastic seal 3 will be compressed in a sealing state against the outer peripheral face 1a of the water pipe 1.

The seal segment 3A comprises a single integral assembly consisting of a pair of peripheral sealing portions 3a disposed at the opposed ends in the pipe axis direction X and a pair of axial sealing portions 3b interconnecting the opposed ends of the peripheral sealing portions 3a and disposed substantially parallel with each other relative to the pipe axis direction X.

Each peripheral end of the joint segment 2A integrally includes a connecting flange 17, which is formed as a projection from the peripheral end projecting radially outward along an imaginary line segment extending through the pipe axis X. On the other hand, at each of opposed sides in the pipe axis direction X in the inner peripheral face of each joint segment 2A, there is defined an arcuate engaging groove 18 for detachably and gaplessly receiving the peripheral sealing portion 3a of the seal segment 3A. Further, at each of opposed peripheral sides in the inner peripheral face of the joint segment 2A, there is defined a straight engaging groove 19 for detachably and gaplessly receiving the axial sealing portion 3b of the seal segment 3A.

That is to say, the arcuate engaging groove 18 and the straight engaging groove 19 are provided at the attaching area of the seal segment 3A.

Moreover, in the inner peripheral face of the joint segment 2A, at the X-wise more central portion than the arcuate engaging groove 18 where the seal segment 3A is attached, there is defined, along each arcuate engaging groove 18, a further groove 20 for allowing an X-wise expanding elastic deformation of the peripheral sealing portion 3a which occurs in association with the tightening operation of the connecting means 15.

Of the two joint segments 2A, one segment 2A integrally forms a connecting pipe portion 21 for connecting and communicating with a branch pipe assembly (not shown) such as a box-like assembly having a branch pipe, a switching valve and so on. Further, as for the water pipe 1, in the peripheral face of the inwardly engaging/connecting portion 1A on which the branch pipe joint 2 is fitted and at a portion opposed to an opening 22 of the connecting pipe portion 21, there is defined a through hole 23 for communicating between this connecting pipe portion 21 and the water pipe 1. In other words, one of the two joint segments 2A includes the pipe connecting portion 21 which is to be communicated with the through hole 23 defined in the peripheral wall of the inwardly engaging/connecting portion 1A of the water pipe 1 on which the branch pipe joint 2 is fitted.

Referring back to FIG. 1, in the inner peripheral face of the joint segment 2A, a portion thereof offset X-wise toward the terminal end from the arcuate engaging groove 18 comprising the attaching portion for the seal segment 3A is provided as a first deformation-restricting surface 24 which comes into contact with the outer peripheral face 1a of the water pipe 1 in association with the tightening operation of the connecting means 15 for restricting radial deformation of the peripheral wall of the water pipe 1.

Further, in the inner peripheral face of the joint segment 2A, a further portion thereof offset X-wise toward the center from the arcuate engaging groove 18 comprising the attaching portion for the seal segment 3A is provided as a second deformation-restricting surface 25 which comes into contact with the outer peripheral face 1a of the water pipe 1 in association with the tightening operation of the connecting means 15 for restricting radial deformation of the peripheral wall of the water pipe 1.

Also, as shown in FIGS. 1–7, the first and two deformation-restricting surfaces 24, 25 of the joint segment 2A include a number of bite-in portions 26 in the form of projections or ridges for biting into the outer peripheral face 1a of the water pipe 1.

The bite-in portion 26 includes a first group of projections 27 extending along the peripheral direction and a second group of projections 28 extending with inclination relative to both the axis direction X and the peripheral direction. More particularly, the groups of projections located at the peripherally oppose ends of the two deformation-restricting surfaces 24, 25 of each joint segment 2A and the further groups of projections located on the X-wise opposed sides in the periphery of the opening 22 of the connecting pipe portion 21 in the second deformation-restricting surface 25 of the one joint segment 2A having the connecting pipe portion 21 are provided as the first group of projections 27.

On the other hand, those groups of projections which are formed on the peripherally intermediate sides of the deformation-restricting surfaces 24, 25 of the joint segment 2A and which are disposed X-wise side adjacent the peripheral edge of the opening 22 of the connecting pipe portion 21 are provided as the second group of projections 28.

Further, the second group of projections 28 consists of two sub-groups of projections which are inclined in the opposite directions to each other, i.e. the group of right-wise inclined projections 28a which are aligned along in the clockwise direction and the group of left-wise inclined projections 28b which are aligned along the counterclockwise direction. More specifically, each projection 29 of the group of right-wise inclined projections 28a and each projection 29 of the group of left-wise inclined projections 28b are disposed in the opposite directions with an inclination of about 60 degrees relative to the pipe axis X, respectively. And, these sub-groups, i.e. the group of right-wise inclined projections 28a and the group of left-wise inclined projections 28b together constituting the second group of projections 28 are distributed side by side in the peripheral direction across the peripheral center as the borderline therebetween.

Each of these projections 29 constituting the first group of projections 27 or second group of projections 28 has a projecting height of about 1 mm, a length of about 10 mm and a width of 1 mm.

Because of the possible dimensional tolerance in the outer diameter of the water pipe 1 and also that of the inner diameters of the two deformation-restricting surfaces 24, 25 of the joint segment 2A, there is reserved a maximum radial gap of 1 mm or less between the outer peripheral face 1a of the water pipe 1 and the deformation-restricting surfaces 24, 25 of the joint segment 2A. With this in combination with the above-mentioned setting of projecting height of the projection 29 at about 1 mm, all of the projections 29 may be allowed to bite into the outer peripheral face of the water pipe 1 in a reliable manner.

Incidentally, the connecting means 15 consists essentially of bolts 30 which are inserted through the bolt inserting holes 17A defined in the connecting flanges 17 of one joint segment 2A and also through the bolt inserting holes 17A defined in the connecting flanges 17 of the other joint segment 2A and of nuts 31 to be threaded with the bolts 30.

[Second Embodiment]

Figure 8:
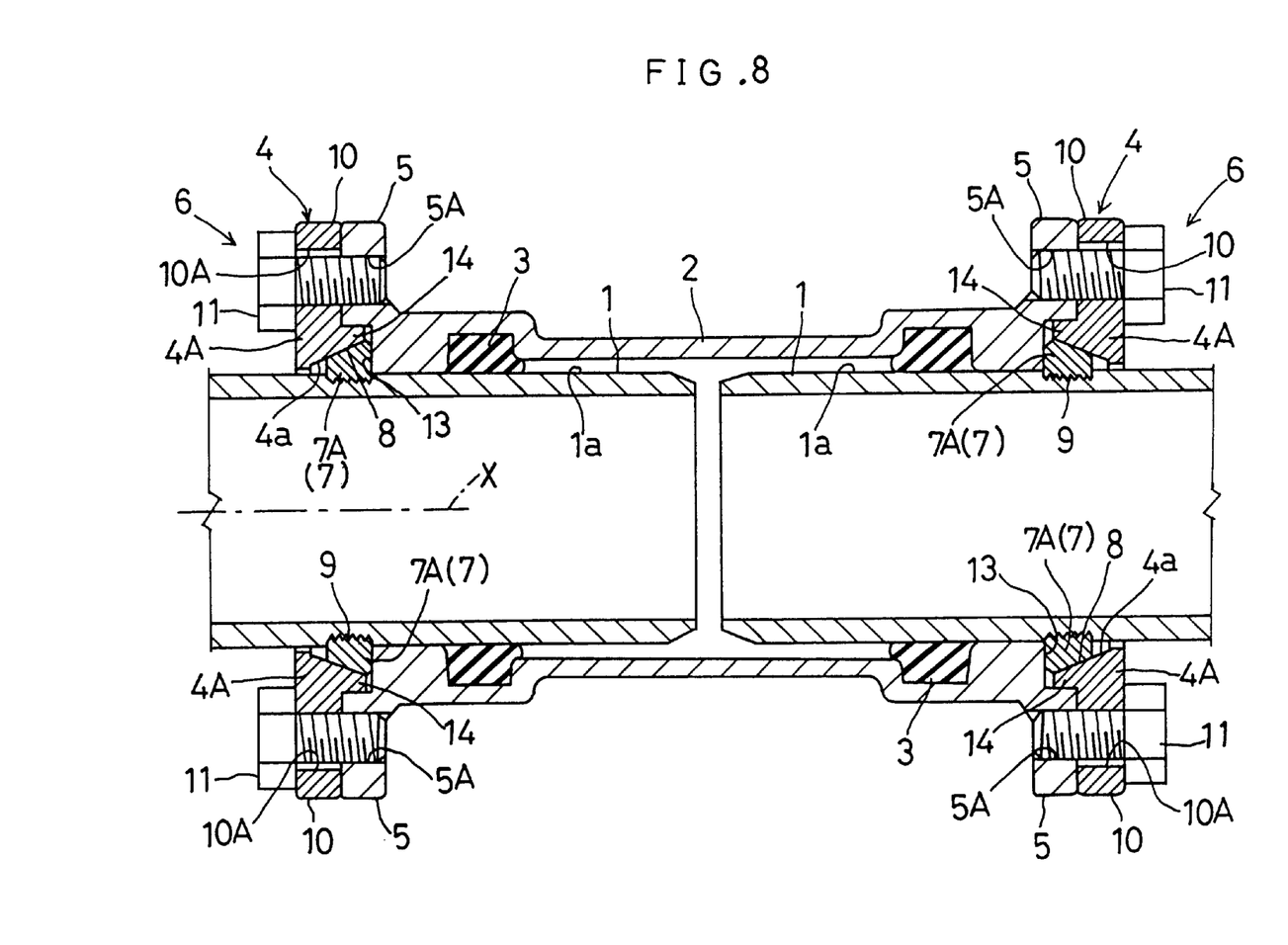
FIG. 8 is a section view in a front elevation showing a pipe joint fixing construction according to a second embodiment of the present invention.

In the first embodiment described above, the pipe joint body 2 comprises a T-shaped branch pipe joint, and portions of the inner peripheral face of each joint segment 2A constituting the branch pipe joint 2 are modified as the deformation-restricting surfaces. The present invention is not limited thereto. For instance, as shown in FIG. 8, the pipe joint body 2 may be an external pipe cover joint to be fitted over opposed terminal ends of two fluid transport pipes 1 for joining these pipes 1 end-to-end. In this case, on each fluid transport pipe 1, there are fitted a press ring 4 including a plurality of peripherally divided press-ring segments 4A. A fastener means 6 is provided for fastening each segment 4A of the press ring 4 to a connecting portion 5 of the pipe cover joint 2 in the direction of pipe axis X. Between an outer peripheral face 1a of the fluid transport pipe 1 and an inner peripheral face 4a of each press ring 4, there is interposed a retainer member 7 capable of radially biting into the outer peripheral face 1a of the fluid transport pipe 1. Further, the inner peripheral face 4a of the press ring 4 includes a tapered cam face 8 for radially reducing or deforming the retainer member 7 as the pipe cover joint 2 and each press ring 4 are moved closer to each other along the direction of pipe axis X in association with the fastening operation of the fastener means 6.

Further, at portions of the pipe cover joint 2 and each press-ring segment 4A opposed to each other in the direction of pipe axis X, there are formed an engaging recess 13 and an engaging projection 14 which come into engagement with each other along the pipe axis direction X in association with the fastening operation of the fastener means 6, i.e. fastening operation of the bolt 11 to the female screw hole 5A. so as to restrict a relative radial displacement between the pipe cover joint 2 and each press-ring segment 4A. The engaging recess 13 is provided as an annular recess in each of the opposed end faces in the pipe axis direction X of the pipe cover joint 2, whereas the engaging projection 14 is provided as an semi-circular projection formed integrally with one end face of each press-ring segment 4A.

Incidentally, in this second embodiment, the deformation-restricting surfaces described in the first embodiment are not provided.

The rest of the construction of this embodiment are substantially same as the first embodiment. Like components or components having like functions are denoted with like reference marks or numerals and will not be described here.

[Other Embodiments]

In the respective embodiments described hereinbefore, at the portions of the pipe joint body 2 and each press-ring segment 4A opposed to each other in the direction of pipe axis X, there are formed the engaging recess 13 and the engaging projection 14 which come into engagement with each other along the pipe axis direction X in association with the fastening operation of the fastener means 6, i.e. fastening operation of the bolt 11 to the female screw hole 5A. so as to restrict a relative radial displacement between the branch pipe joint 2 and each press-ring segment 4A. Further, the engaging recess 13 is formed annular and the engaging projection 14 is formed semi-circular. The invention, however, is not limited to these particular constructions. For instance, a plurality of hole-like recesses may be defined in each X-wise end face of the pipe joint body 2, while a plurality of engaging projections 14 for engagement with the respective recesses 13 may be formed on one end face of each press-ring segment 4A.

The pipe joint body 2 may further alternatively comprise a repairing pipe which is used for covering a water-leaking hole such as a damaged hole or fissure developed in the peripheral wall of the water pipe 1 so as to reform the water pipe 1 or a receiver pipe portion provided an end of one water pipe 1 for receiving and joining two water pipes 1 together.

In the first embodiment, the fastener means 6 comprises the bolts 11 and female screw holes 5A. However, the specific construction of this fastener means 6 is not particularly limited in the present invention, this fastener means may employ instead a bolt and a nut or an eccentric cam mechanism for instance.

In the first embodiment, the pipe joint body 2 consists of two peripherally divided pipe joint segments 2A. Instead, this pipe joint body 2 may consist of more than two peripherally divided pipe joint segments 2A.

In the first embodiment, the fluid transport pipe 1 comprises a water pipe. However, the invention may be applied also in a petroleum pipe line if the fluid transport pipe 1 is made of synthetic resin having resistance against petroleum.

The present invention may be embodied in other specific forms without departing from the spirit or essential characteristics thereof. The present embodiments are therefore to be considered in all respects as illustrative and not restrictive, the scope of the invention being indicated by the appended claims rather than the foregoing description and all changes which come within the meaning and range of equivalency of the claims are therefore intended to be embraced therein.

What is claimed is:

1. A construction for fixing a pipe joint, which comprises:
   a pipe joint body within which a fluid transport pipe is connected and engaged, elastic seal means being interposed between the pipe joint body and the fluid transport pipe to seal therebetween;
   a press ring disposed to be movable relative to the fluid transport pipe along a pipe axis direction, the press ring being peripherally divided to a plurality of press-ring segments, the press ring defining a cam surface in an inner peripheral face thereof;
   a fastener means operable to fasten said each press-ring segment to the pipe joint body along the pipe axis direction;
   a retainer member interposed between an outer peripheral face of the fluid transport pipe and the inner peripheral face of the press ring, the retainer member being displaced in a pipe radius reducing direction via the cam surface in association with a relative approaching movement between the pipe joint body and the press ring along the pipe axis direction resulting from a fastening operation of the fastener means, so that the retainer member radially bites into the outer peripheral face of the fluid transport pipe;
   wherein the pipe joint body and each press-ring segment include, at respective portions thereof opposed to each other along the pipe axis direction, an engaging recess and an engaging projection which come into engagement wish each other along the pipe axis direction in association with the fastening operation of the fastener means so as to restrict a relative radial displacement between the pipe joint body and each press-ring segment.

2. The construction according to claim 1, wherein the pipe joint body is peripherally divided into a plurality of pipe-joint segments; the elastic seal means is compressed into a sealing state in association with a tightening operation of a connecting means for connecting and tightening together peripherally adjacent ones of the pipe-joint segments; and said each pipe-joint segment includes, in its inner peripheral face and at each portion thereof axially offset toward an adjacent axial end thereof relative to an axially intermediate portion thereof where the elastic seal means is attached, a first deformation-restricting surface which comes into contact with the outer peripheral face of the fluid transport pipe in association with the tightening operation of said connecting means for restricting radial deformation of the fluid transport pipe.

3. The construction according to claim 2, wherein said each pipe-joint segment further includes, in its inner peripheral face and at a further portion thereof offset toward an axial center than the further portion where the elastic seal means is attached, a second deformation-restricting surface which comes into contact with the outer peripheral face of the fluid transport pipe in association with the tightening operation of said connecting means for restricting radial deformation of the fluid transport pipe.

4. The construction according to claim 3, wherein each of the first and second deformation-restricting surfaces includes a bite-in portion in the form of projection capable of biting into the outer peripheral face of the fluid transport pipe.

5. The construction according to claim 4, wherein the bite-in portion includes a first group of projections extending peripherally and a second group of projections inclined relative to both the axial and peripheral directions, and said second group of projections are provided at a peripherally intermediate portion of the pipe-joint segment.

6. The construction according to claim 5, wherein the second group of projections include two kinds of sub-groups of projections whose inclinations are in opposition to each other.

7. The construction according to claim 1, wherein said press-ring segments are fastened to opposed axial ends of said pipe joint body by said fastener means respectively, said retainer member is interposed between the outer peripheral face of said fluid transport pipe and the inner peripheral face of each one of the press-ring segments, said pipe joint body includes a connecting pipe portion communicated with a through hole defined in a peripheral wall of the fluid transport pipe.

8. The construction according to claim 7, wherein the pipe joint body is peripherally divided into a plurality of pipe-joint segments; the elastic seal means is compressed into a sealing state in association with a tightening operation of a connecting means for connecting and tightening together peripherally adjacent ones of the pipe-joint segments; and said each pipe-joint segment includes, in its inner peripheral face and at each portion thereof axially offset toward an adjacent axial end thereof relative to an axially intermediate portion thereof where the elastic seal means is attached, a first deformation-restricting surface which comes into contact with the outer peripheral face of the fluid transport pipe in association with the tightening operation of said connecting means for restricting radial deformation of the fluid transport pipe.

9. The construction according to claim 8, wherein said each pipe-joint segment further includes, in its inner peripheral face and at a further portion thereof offset toward an axial center than the further portion where the elastic seal means is attached, a second deformation-restricting surface which comes into contact with the outer peripheral face of the fluid transport pipe in association with the tightening operation of said connecting means for restricting radial deformation of the fluid transport pipe.

10. The construction according to claim 9, wherein each of the first and second deformation-restricting surfaces includes a bite-in portion in the form of projection capable of biting into the outer peripheral face of the fluid transport pipe.

11. The construction according to claim 10, wherein the bite-in portion includes a first group of projections extending peripherally and a second group of projections inclined relative to both the axial and peripheral directions, and said second group of projections are provided at a peripherally intermediate portion of the pipe-joint segment.

12. The construction according to claim 11, wherein the second deformation-restricting surface includes the first group of projections at each axial side of the peripheral opening edge of the connecting pipe portion.

13. The construction according to claim 12, wherein the second group of projections include two kinds of sub-groups of projections whose inclinations are in opposition to each other.

* * * * *